United States Patent
Ono et al.

(10) Patent No.: US 12,339,157 B2
(45) Date of Patent: Jun. 24, 2025

(54) FLIGHT DEVICE

(71) Applicant: ISHIKAWA ENERGY RESEARCH CO., LTD., Ota (JP)

(72) Inventors: Yasutoshi Ono, Ota (JP); Mitsuru Ishikawa, Ota (JP)

(73) Assignee: ISHIKAWA ENERGY RESEARCH CO., LTD., Ota (JP)

( * ) Notice: Subject to any disclaimer, the term of this patent is extended or adjusted under 35 U.S.C. 154(b) by 296 days.

(21) Appl. No.: 17/928,380

(22) PCT Filed: Mar. 29, 2022

(86) PCT No.: PCT/JP2022/015388
§ 371 (c)(1),
(2) Date: Nov. 29, 2022

(87) PCT Pub. No.: WO2022/210691
PCT Pub. Date: Oct. 6, 2022

(65) Prior Publication Data
US 2023/0221166 A1 Jul. 13, 2023

(30) Foreign Application Priority Data
Apr. 2, 2021 (JP) .................................. 2021-063661

(51) Int. Cl.
*G01G 19/08* (2006.01)
*B64C 39/02* (2023.01)
(Continued)

(52) U.S. Cl.
CPC ............ *G01G 19/08* (2013.01); *B64C 39/024* (2013.01); *B64U 50/19* (2023.01); *B64U 50/30* (2023.01);
(Continued)

(58) Field of Classification Search
CPC ........ G01G 19/08; B64U 50/30; B64U 50/19; B64U 2201/20; B64U 2101/45;
(Continued)

(56) References Cited

U.S. PATENT DOCUMENTS

| | | | |
|---|---|---|---|
| 2017/0261998 A1* | 9/2017 | Wang | B64C 25/54 |
| 2018/0074523 A1* | 3/2018 | Cantrell | G06Q 10/06 |
| 2021/0216085 A1* | 7/2021 | Wake | G08G 5/0021 |

FOREIGN PATENT DOCUMENTS

| | | |
|---|---|---|
| CN | 205353316 U | 6/2016 |
| CN | 107140195 A | 9/2017 |

(Continued)

OTHER PUBLICATIONS

Chihiro, Wake "Drone, Method of Controlling Drone, and Drone Control Program" WO 2020/137554 Machine Translation to WIPO, Jul. 2, 2020 (Year: 2020).*

(Continued)

*Primary Examiner* — Woody A Lee, Jr.
*Assistant Examiner* — Joshua R Beebe
(74) *Attorney, Agent, or Firm* — WHDA, LLP

(57) ABSTRACT

The present invention provides a flying apparatus that can accurately measure a weight of a transported objected in a simple configuration. The flying apparatus 10 includes rotors 11, motors 12, a flight sensor 13, an electric power conversion unit 14, and a computation control unit 15. The flight sensor 13 measures physical quantities acting on a fuselage base portion 16. The computation control unit 15 generates instruction signals based on the physical quantities to cause the fuselage base portion 16 to be at a predetermined position in a predetermined attitude. The electric power conversion unit 14 adjusts amounts of electric power supplied to the motors 121 and the like based on the received instruction signals. Moreover, the computation control unit (Continued)

15 calculates an estimated weight that is an estimation value of a weight of the transported object, based on magnitudes of the instruction signals.

8 Claims, 5 Drawing Sheets

(51) Int. Cl.
  *B64U 50/19* (2023.01)
  *B64U 50/30* (2023.01)
  *G05D 1/00* (2006.01)
  *B64U 10/14* (2023.01)
  *B64U 101/40* (2023.01)
  *B64U 101/45* (2023.01)

(52) U.S. Cl.
  CPC ............ *G05D 1/0816* (2013.01); *B64U 10/14* (2023.01); *B64U 2101/40* (2023.01); *B64U 2101/45* (2023.01); *B64U 2201/20* (2023.01)

(58) Field of Classification Search
  CPC .. B64U 2101/40; B64U 10/14; B64C 39/024; G05D 1/0816
  See application file for complete search history.

(56) References Cited

FOREIGN PATENT DOCUMENTS

| | | |
|---|---|---|
| CN | 108522475 A | 9/2018 |
| CN | 109803887 A | 5/2019 |
| JP | 2003-159674 A | 6/2003 |
| JP | 2020096437 A | 6/2020 |
| JP | 2020117203 A | 8/2020 |
| JP | 2020142772 A | 9/2020 |
| JP | 2020152370 A | 9/2020 |
| KR | 101668981 B1 | 10/2016 |
| WO | 2019/168042 A1 | 9/2019 |
| WO | 2020090671 A1 | 5/2020 |
| WO | 2020137554 A1 | 7/2020 |

OTHER PUBLICATIONS

Office Action dated Aug. 20, 2024, issued in counterpart JP Application No. 2021-097979, with English translation. (7 pages).
Office Action dated Apr. 15, 2021, issued in counterpart JP application No. 2021-063661 with English translation. (7 pages).
International Search Report dated May 17, 2022, issued in counterpart International Application No. PCT/JP2022/015388, with English Translation. (5 pages).
Written Opinion of the International Searching Authority (Form PCT/ISA/237) dated May 17, 2022, issued in counterpart International Application No. PCT/JP2022/015388, (6 pages).
Office Action dated Dec. 17, 2024, issued in counterpart JP Application No. 2021-097979, with English translation. (7 pages).
Office Action dated Jun. 20, 2024, issued in counterpart to CN Application No. 202111048632.1. (7 pages).
Extended (suuplementary) European Search Report dated Feb. 14, 2025, issued in EP Application No. 22780902.7. (11 pages).
English Translation of Office Action dated Jun. 20, 2024, issued in counterpart CN Application No. 202111048632.1. (5 pages).

* cited by examiner

FLIGHT DEVICE

TECHNICAL FIELD

The present invention relates to a flying apparatus.

BACKGROUND ART

A flying apparatus capable of unmanned air flight has been conventionally known. Such a flying apparatus can perform air flight by using thrust of rotors rotationally driven about vertical axes.

Conceivable application fields of the flying apparatus include, for example, fields of transport, surveying, image capturing, agriculture, and the like. In the case where the flying apparatus is to be applied to such fields, the flying apparatus is equipped with various devices and agents.

In view of stable flight of the flying apparatus, weights of various devices and agents transported by the flying apparatus need to be measured. Patent Literature 1 and Patent Literature 2 describe inventions in which a remaining amount in a tank provided in a flying apparatus is estimated.

In Patent Literature 1, the flying apparatus includes a load cell as a weight measurement device. Using the load cell enables measurement of a weight difference to a weight of an empty tank, and enables detection of a remaining amount of an agricultural chemical in the attached tank during agricultural chemical spraying. Accordingly, the remaining amount of the agricultural chemical can be detected without use of a flow meter.

Patent Literature 2 describes remaining amount obtaining means for obtaining information on a remaining amount of a content in an aerosol container. In this case, a weight senor is used to detect the information on the remaining amount of the content in the aerosol container.

CITATION LIST

Patent Literature

Patent Literature 1: Japanese Patent Application Publication No. 2020-117203
Patent Literature 2: Japanese Patent Application Publication No. 2020-142772

SUMMARY OF THE INVENTION

Problem to be Solved by the Invention

However, in the flying apparatuses described in Patent Literature 1 and Patent Literature 2 described above, there is a room of improvement from a viewpoint of measuring a weight of a transported object transported by a flying apparatus at low cost.

Specifically, in each of the inventions described in Patent Literature 1 and Patent Literature 2, the flying apparatus includes the dedicated load cell or weight sensor to detect the remaining amount in the tank. Accordingly, this may lead to high cost. Moreover, the load acting on the load cell or weight senor sometimes does not accurately reflect the remaining amount in the tank depending on the flight condition of the flying apparatus. Thus, there is a room of improvement also from a viewpoint of accurately estimating the remaining amount in the tank.

The present invention has been made in view of the aforementioned circumstances, and an object thereof is to provide a flying apparatus that can accurately measure a weight of a transported object in a simple configuration.

Means for Solving the Problems

A flying apparatus according to the present invention is a flying apparatus that transports a transported object, including: a rotor; a motor; a flight sensor; an electric power conversion unit; and a computation control unit. Here, the rotor is rotated to generate thrust for causing a fuselage base portion to go airborne. The motor rotationally drives the rotor. The flight sensor measures a physical quantity acting on the fuselage base portion. The computation control unit generates an instruction signal based on the physical quantity to cause the fuselage base portion to be at a predetermined position in a predetermined attitude. The electric power conversion unit adjusts an amount of electric power supplied to the motor based on the received instruction signal. The computation control unit calculates an estimated weight that is an estimation value of a weight of the transported object, based on a magnitude of the instruction signal.

In the flying apparatus according to the present invention, the flying apparatus further includes a spraying device, in which the transported object is an agent sprayed by the spraying device, the computation control unit calculates an estimated remaining amount that is an estimation value of a remaining amount of the agent, based on the magnitude of the instruction signal.

In the flying apparatus according to the present invention, the flying apparatus includes a plurality of the rotors, a plurality of motors, and a plurality of the electric power conversion units. The computation control unit generates a plurality of the instruction signals to be inputted into the respective electric power conversion units, and estimates the estimated weight of the transported object based on an instruction signal average value that is an average value of the instruction signals.

In the flying apparatus according to the present invention, the flying apparatus further includes a battery that supplies electric power to the electric power conversion unit, in which the computation control unit calculates the estimated weight based on the instruction signal and a voltage value of the battery.

In the flying apparatus according to the present invention, a signal indicating the estimated weight is transmitted to a display device, and the estimated weight is displayed on a display unit of the display device.

Effects of the Invention

A flying apparatus according to the present invention is a flying apparatus that transports a transported object, including: a rotor; a motor; a flight sensor; an electric power conversion unit; and a computation control unit. Here, the rotor is rotated to generate thrust for causing a fuselage base portion to go airborne. The motor rotationally drives the rotor. The flight sensor measures a physical quantity acting on the fuselage base portion. The computation control unit generates an instruction signal based on the physical quantity to cause the fuselage base portion to be at a predetermined position in a predetermined attitude. The electric power conversion unit adjusts an amount of electric power supplied to the motor based on the received instruction signal. The computation control unit calculates an estimated weight that is an estimation value of a weight of the transported object, based on a magnitude of the instruction signal. Accordingly, the flying apparatus of the present invention can estimate the weight of the transported object from the instruction signal generated to cause the fuselage base portion to be at the predetermined position in the predetermined attitude. Thus, it is possible to estimate the weight of the transport object while eliminating the need for a dedicated weight senor.

In the flying apparatus according to the present invention, the flying apparatus further includes a spraying device, in which the transported object is an agent sprayed by the spraying device, the computation control unit calculates an estimated remaining amount that is an estimation value of a remaining amount of the agent, based on the magnitude of the instruction signal. Accordingly, the flying apparatus of the present invention can estimate the remaining amount of the sprayed agent in real time.

In the flying apparatus according to the present invention, the flying apparatus includes a plurality of the rotors, a plurality of motors, and a plurality of the electric power conversion units. The computation control unit generates a plurality of the instruction signals to be inputted into the respective electric power conversion units, and estimates the estimated weight of the transported object based on an instruction signal average value that is an average value of the instruction signals. Accordingly, the flying apparatus of the present invention can stably estimate the weight of the transported object regardless of whether the flying apparatus is in a hovering state or a moving state by estimating the estimated weight of the transported object based on the instruction signal average value.

In the flying apparatus according to the present invention, the flying apparatus further includes a battery that supplies electric power to the electric power conversion unit, in which the computation control unit calculates the estimated weight based on the instruction signal and a voltage value of the battery. Accordingly, the flying apparatus of the present invention can more accurately calculate the estimated weight by taking the voltage value of the battery into consideration in addition to the instruction signal in the calculation of the estimated weight.

In the flying apparatus according to the present invention, a signal indicating the estimated weight is transmitted to a display device, and the estimated weight is displayed on a display unit of the display device. According to the flying apparatus of the present invention, for example, an operator operating the flying apparatus can know the estimated weight of the transported object in real time.

MODES FOR CARRYING OUT THE INVENTION

Figure 1:
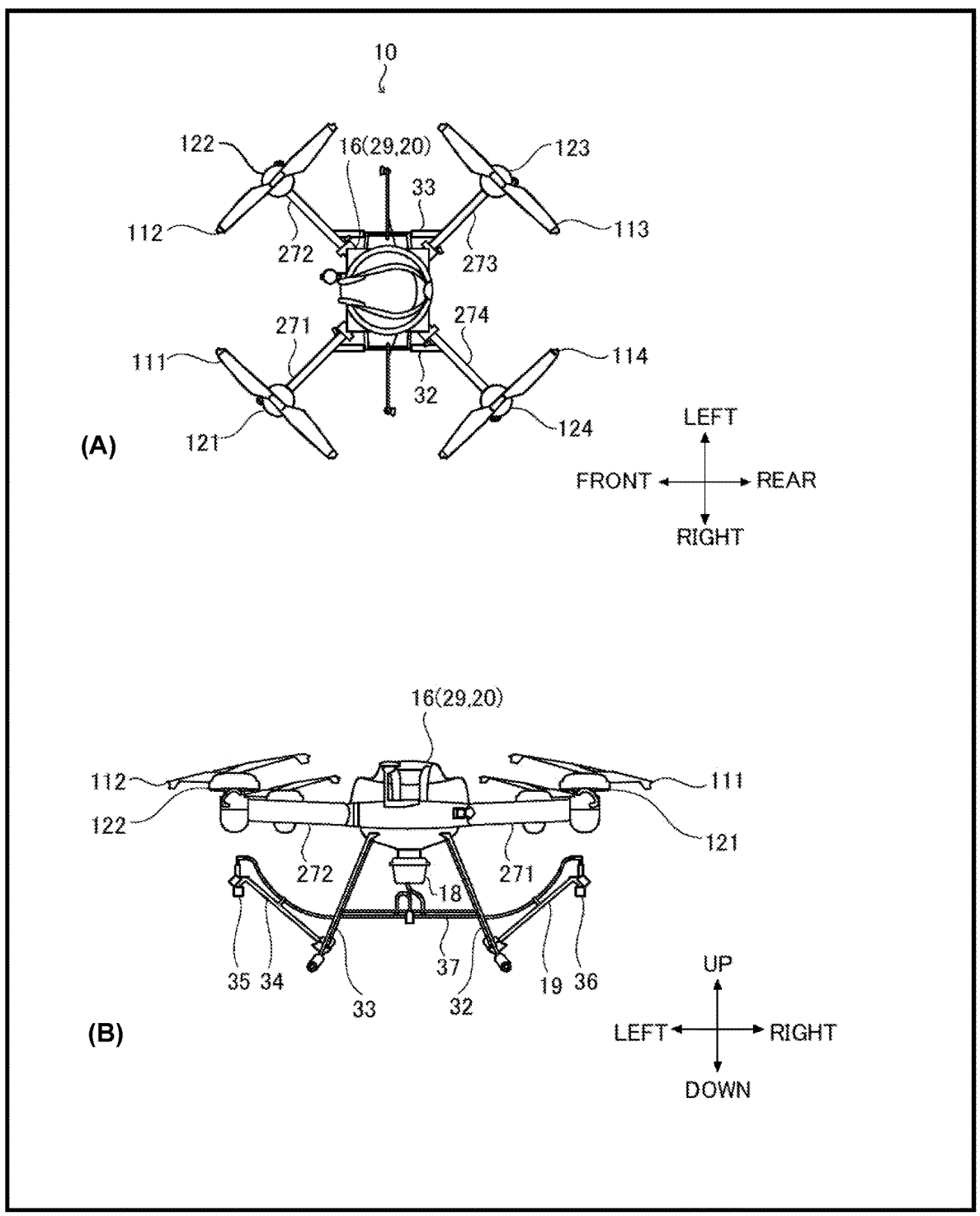
FIG. 1 is a diagram illustrating a flying apparatus according to an embodiment of the present invention, (A) is a top view illustrating the flying apparatus, and (B) is a front view illustrating the flying apparatus.

A flying apparatus 10 according to the present embodiment is described below with reference to the drawings. In the following description, the same members are essentially denoted by the same reference numerals, and repeated description is omitted. Moreover, in the following description, directions of up, down, front, rear, left, and right are used, and left and right are left and right in the case where the flying apparatus 10 is viewed from the front side in FIG. 1(A).

FIG. 1(A) is a top view illustrating the flying apparatus 10, and FIG. 1(B) is a front view illustrating the flying apparatus 10.

With reference to FIG. 1(A), the flying apparatus 10 mainly includes a fuselage base portion 16, a power unit that is mounted in the fuselage base portion 16 and that is not illustrated herein, arms 271 and the like that extend from a peripheral portion of the fuselage base portion 16 toward a surrounding area, motors 121 and the like that are arranged at outer end portions of the arms 271 and the like, and rotors 111 and the like that are rotated by the motors 121 and the like. In the following description, the motors 121 and the like are collectively referred to as motors 12 and the rotors 111 and the like are collectively referred to as rotors 11.

The flying apparatus 10 uses electric power obtained from a battery housed in the fuselage base portion 16 to cause the motors 121 and the like to rotate the rotors 111 and the like at predetermined rotation speeds, and can thereby go airborne and move in the air. In this description, the flying apparatus 10 for spraying an agricultural chemical on a farm field such as a paddy field is illustrated as an example.

The fuselage base portion 16 is arranged at the center of the flying apparatus 10, and various devices not illustrated herein are housed in the fuselage base portion 16. An outer skin of the fuselage base portion 16 is covered with a synthetic resin plate or a steel plate shaped in a predetermined shape. Moreover, a chemical agent tank 29 that stores a chemical agent 20 to be described later is built in the fuselage base portion 16.

The arm 271, an arm 272, an arm 273, and an arm 274 extend outward from an electric power conversion unit 14.

The motor 121 and the rotor 111 are arranged in an outer end portion of the arm 271. The motor 122 and the rotor 112 are arranged in an outer end portion of the arm 272. The motor 123 and the rotor 113 are arranged in an outer end portion of the arm 273. The motor 124 and the rotor 114 are arranged in an outer end portion of the arm 274. In this case, the rotors 111 and the like are rotated to generate thrust for causing the fuselage base portion 16 to go airborne. Moreover, the motors 121 and the like rotationally drive the rotors 111 and the like.

A liquid agricultural chemical, a granular agricultural chemical, or the like can be adopted as the chemical agent 20 stored in the chemical agent tank 29.

With reference to FIG. 1(B), a leg portion 32 and a leg portion 33 that come into contact with the ground in landing are arranged in a lower portion of the fuselage base portion 16. The leg portion 32 and the leg portion 33 are members also referred to as skids and, in a situation where the flying apparatus 10 lands, lower ends of the leg portion 32 and the leg portion 33 come into contact with the ground.

A spraying device 18 for spraying the chemical agent 20 is arranged below the fuselage base portion 16. A pump for conveying the chemical agent 20 is built in the spraying device 18.

Moreover, a support arm 19 that extends toward the upper right side is connected to the leg portion 32, and a nozzle 36 is installed at an upper end of the support arm 19. Similarly, a support arm 34 that extends toward the upper left side is connected to the leg portion 33, and a nozzle 35 is installed at an upper end of the support arm 34. The nozzle 35 and the nozzle 36 are connected to the spraying device 18 via pipes 37.

The spraying device 18 runs a pump of the spraying device 18 during a spraying on state, based on an instruction from an operation device 28 to be described later. This causes the chemical agent 20 stored in the chemical agent tank 29 to be sprayed downward from the nozzle 35 and the nozzle 36 via the pipes 37 by pressure of the spraying device 18. Meanwhile, the spraying device 18 does not run the pump during a spraying off state, based on an instruction from the operation device 28 to be described later, and no chemical agent 20 is sprayed from the nozzle 35 and the nozzle 36.

Figure 2:
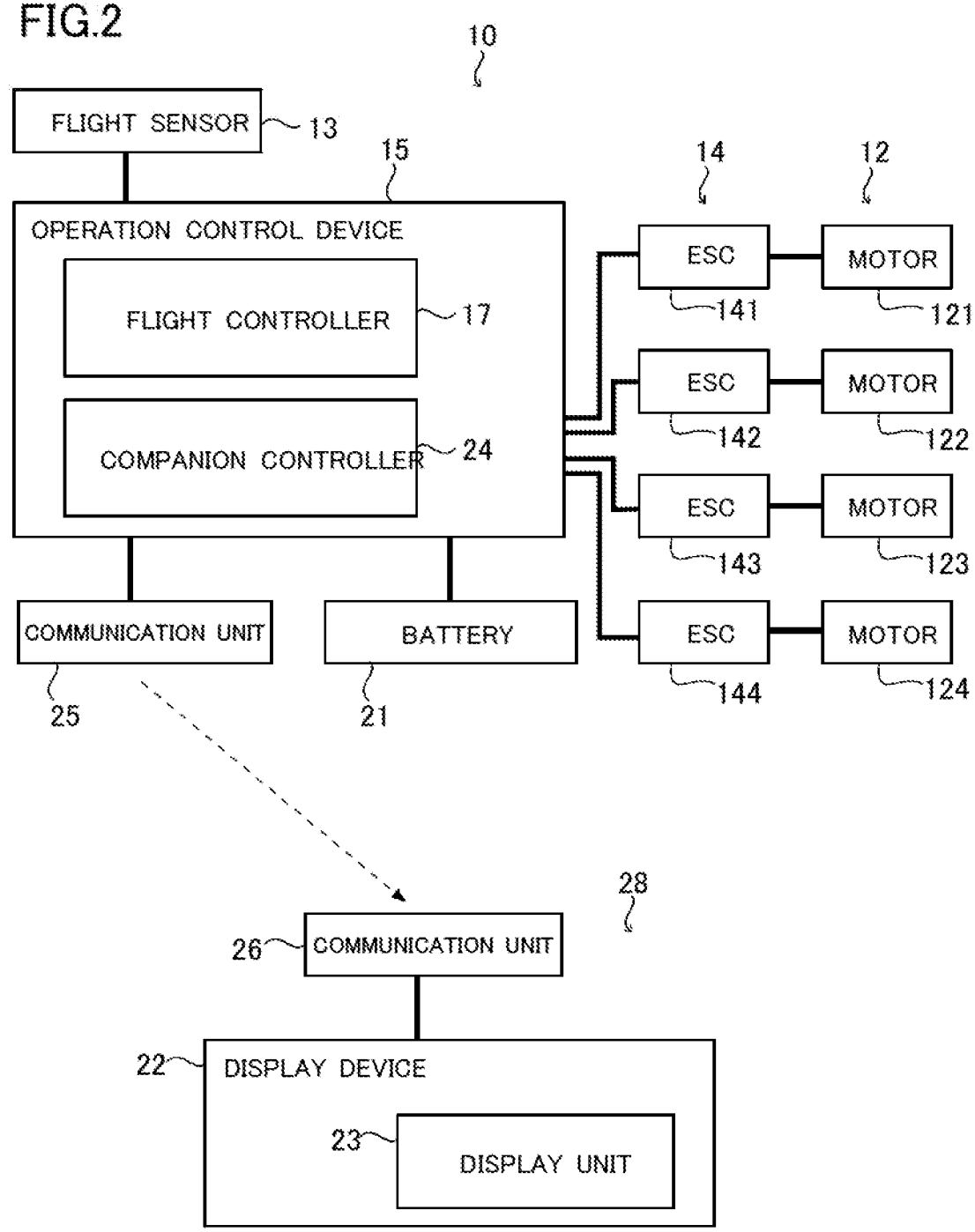
FIG. 2 is a block diagram illustrating a connection configuration of the flying apparatus according to the embodiment of the present invention.

FIG. 2 is a block diagram illustrating a connection configuration of the flying apparatus 10.

The flying apparatus 10 mainly includes the motors 121 and the like, a flight sensor 13, the electric power conversion unit 14, and a computation control unit 15, and transports the chemical agent 20 as a transported object. Furthermore, the flying apparatus 10 includes a communication unit 25, a battery 21, and the electric power conversion unit 14. Moreover, the operation device 28 is a device operated by an operator on the ground who operates the flying apparatus 10. Moreover, a communication unit 26, a display device 22, and a display unit 23 are installed near the operator.

The flight sensor 13 measures physical quantities acting on the fuselage base portion 16, and transmits signals indicating magnitudes of these physical quantities to the computation control unit 15. Sensors included in the flight sensor 13 are, for example, an acceleration sensor, an angular velocity sensor, a geomagnetic sensor, an air pressure sensor, and a GNSS antenna. The acceleration sensor detects changes in tilt and motion as physical quantities. The angular velocity sensor detects changes in tilt and direction as physical quantities. The geomagnetic sensor detects a bearing as a physical quantity by means of magnetic force. The air pressure sensor detects an altitude as a physical quantity. The GNSS antenna determines a position.

The computation control unit 15 includes a computation device formed of a CPU (central processing unit) and a storage device formed of a RAM (random access memory) and a ROM (read only memory), and controls operations of the entire flying apparatus 10. Moreover, as described later, the computation control unit 15 adjusts amounts of electric power supplied to the motors 121 and the like based on instruction signals received from the flight sensor 13. Furthermore, as described later, the computation control unit 15 calculates an estimated remaining amount that is an estimation value of a remaining amount of the chemical agent 20 being the transferred object, based on the magnitudes of the instruction signals.

The computation control unit 15 includes a flight controller 17 and a companion controller 24.

The flight controller 17 generates an instruction signal for setting the position, attitude, moving speed, and the like of the flying apparatus 10 to predetermined position, attitude, moving speed, and the like, based on the signals received from the flight sensor 13. For example, a DUTY value in PWM control can be adopted as this instruction signal. In the present embodiment, since the flying apparatus 10 includes four motors of the motor 121, the motor 122, the motor 123, and the motor 124, the DUTY value is calculated for each of the motors 121.

The companion controller 24 calculates the estimated remaining amount of the chemical agent 20 based on information received from the flight controller 17 such as, for example, information received from the flight sensor 13 and information indicating voltage of the battery 21.

The electric power conversion unit 14 includes an ESC 141 to an ESC 144. Note that the ESC is an abbreviation of electric speed controller, and is an electronic device that controls the number of revolutions of the motor 12. The ESC 141 is arranged between the motor 121 and the computation control unit 15, and controls the number of revolutions of the motor 121. The ESC 142 is arranged between the motor 122 and the computation control unit 15, and controls the number of revolutions of the motor 122. The ESC 143 is arranged between the motor 123 and the computation control unit 15, and controls the number of revolutions of the motor 123. The ESC 144 is arranged between the motor 124 and the computation control unit 15, and controls the number of revolutions of the motor 124. The greater the DUTY value received from the flight controller 17 is, the higher the speed at which the motor 121 to the motor 124 are made to rotate by the ESC 141 to the ESC 144.

Basic flight operations of the flying apparatus 10 are described. The flying apparatus 10 can execute various operations of an ascending operation, a hovering operation, a moving operation, and a descending operation. The operations of the flying apparatus 10 are executed by the flight controller 17 based on commands transmitted from the operation device 28 based on operations by the operator.

In each operation, the flight controller 17 adjusts the rotation speeds of the motor 121 to the motor 124 such that the attitude of the flying apparatus 10 becomes a predetermined attitude, based on information received from the acceleration sensor and the angular velocity sensor included in the flight sensor 13.

In the ascending operation, the flight controller 17 causes the motors 12 to rotate at relatively high speeds such that the flying apparatus 10 ascends to a predetermined altitude. The flight controller 17 basically outputs almost same DUTY values to the ESC 141 to the ESC 144 to set the rotation speeds of the motor 121 to the motor 124 to almost same speeds. Moreover, when the flying apparatus 10 ascends to the predetermined altitude, the flight controller 17 executes the hovering operation of maintaining the flying apparatus 10 at a substantially-constant altitude, based on information received from the air pressure sensor included in the flight sensor 13.

In the hovering operation, the flight controller 17 adjusts the rotation speeds of the motor 121 to the motor 122 such that the flying apparatus 10 is maintained at a substantially-constant altitude, based on the information received from the air pressure sensor included in the flight sensor 13. In this case, the flight controller 17 basically outputs almost same DUTY values to the ESC 141 to the ESC 144 to set the rotation speeds of the motor 121 to the motor 124 to almost same speeds.

In the moving operation, the flight controller 17 adjusts the rotation speeds of the motor 121 to the motor 124 such that the flying apparatus 10 can move at a predetermined speed in each of directions of forward, backward, leftward, and rightward. For example, the rotation speeds of the motor 121 and the motor 122 are set higher than the rotation speeds of the motor 123 and the motor 124. Specifically, the flight controller 17 sets the DUTY values outputted to the ESC 141 and the ESC 142 higher than the DUTY values outputted to the ESC 143 and the ESC 144. With reference to FIG. 1(A), this causes the rotor 111 and the rotor 112 to rotate at higher speeds than the rotor 113 and the rotor 114 and causes the fuselage base portion 16 of the flying apparatus 10 to be in a tilted attitude, and the flying apparatus 10 moves in a predetermined direction.

Thereafter, when the flight controller 17 recognizes that the flying apparatus 10 has reached a predetermined position based on output of the GNSS antenna or the like included in the flight sensor 13, the flight controller 17 executes a braking operation. For example, the flight controller 17 sets the rotation speeds of the motor 121 and the motor 122 lower than the rotation speeds of the motor 123 and the motor 124. Specifically, the flight controller 17 sets the DUTY values outputted to the ESC 143 and the ESC 144 higher than the DUTY values outputted to the ESC 141 and the ESC 142. With reference to FIG. 1(A), this causes the rotor 111 and the rotor 112 to rotate at lower speeds than the rotor 113 and the rotor 114 and can stop the planar motion of the flying apparatus 10. Then, the flight controller 17 executes the hovering operation.

In the descending operation, the flight controller 17 causes the motors 12 to rotate at relatively low speeds such that the flying apparatus 10 descends to a predetermined altitude. The flight controller 17 basically outputs almost same DUTY values to the ESC 141 to the ESC 144 to set the rotation speeds of the motor 121 to the motor 124 to almost same speeds. Moreover, when the flying apparatus 10 descends to the predetermined altitude, the flight controller 17 executes the hovering operation of maintaining the flying apparatus 10 at a substantially-constant altitude, based on the information received from the air pressure sensor included in the flight sensor 13.

Figure 3:
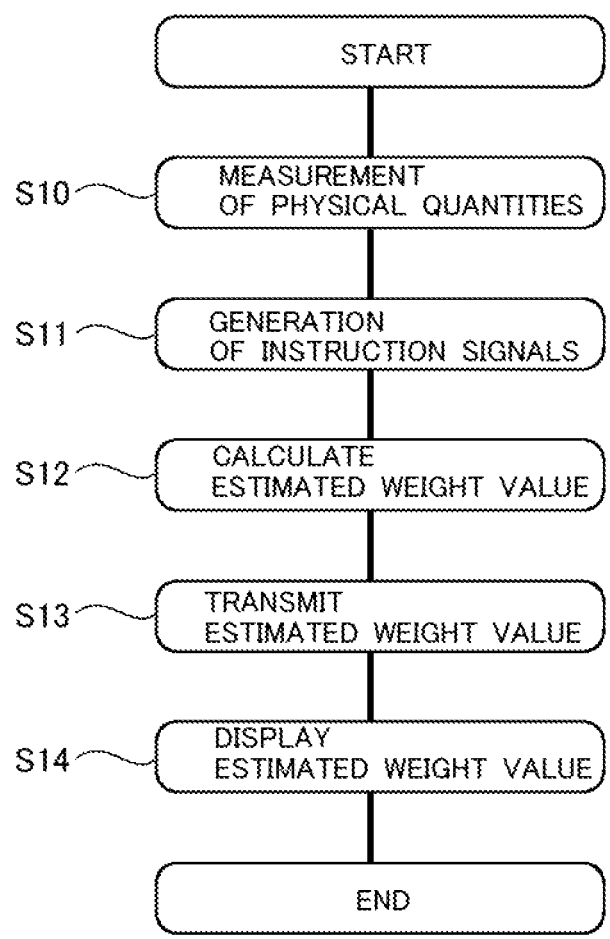
FIG. 3 is a flowchart illustrating a method of calculating an estimated weight value of a transported object in the flying apparatus according to the embodiment of the present invention.
Figure 4:
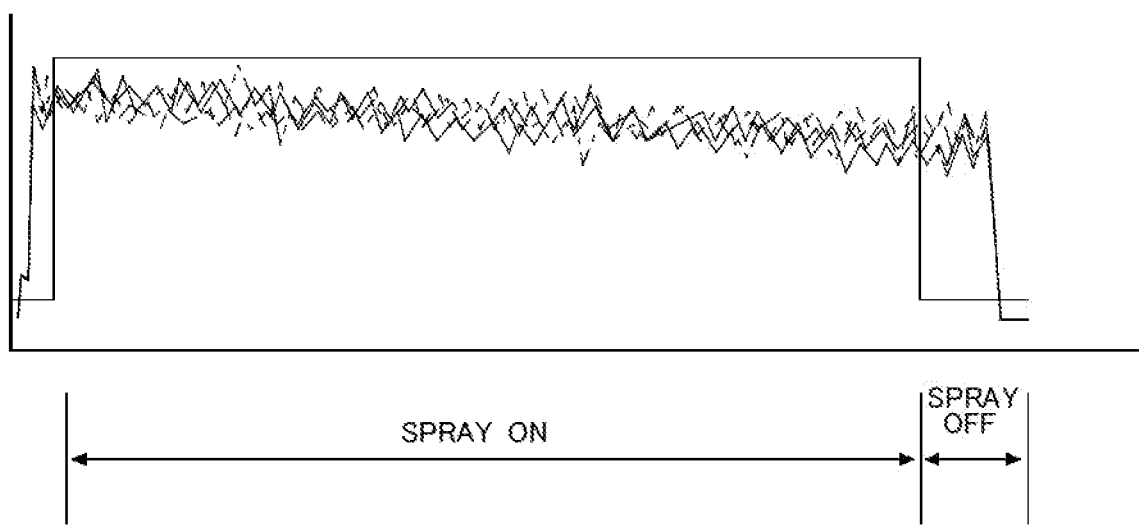
FIG. 4 is a graph illustrating changes in motor output values and a spraying state over time in the flying apparatus according to the embodiment of the present invention.

FIG. 3 is a flowchart illustrating a method of calculating the estimated remaining amount of the chemical agent 20 that is the transported object in the flying apparatus 10.

In step S10, the flight sensor 13 measures the physical quantities. Specifically, the acceleration sensor, the angular velocity sensor, the geomagnetic sensor, the air pressure sensor, the GNSS antenna, and the like included in the flight sensor 13 measures the position, attitude, and the like of the flying apparatus 10. The physical quantities measured by the flight sensor 13 are inputted into the flight controller 17. Moreover, an operation status during flight of the flying apparatus 10 is also inputted into the flight controller 17.

In step S11, the flight controller 17 calculates the DUTY values as the instruction signals based on the aforementioned physical quantities. The flight controller 17 outputs the DUTY values based on the various pieces of information inputted in step S10, the operation status, and the like. The flight controller 17 calculates the DUTY values respectively for the ESC 141 to the ESC 144 illustrated in FIG. 2.

In this case, the DUTY values vary depending on the weight of the flying apparatus 10 including the chemical agent 20. Specifically, in the case of performing the agricultural chemical spraying, the flying apparatus 10 needs to be maintained at a substantially-constant altitude to effectively spray the agricultural chemical on plants such as a rice. Moreover, since the weight of the chemical agent 20 is large in an initial stage of the agricultural chemical spraying, the DUTY values selected by the flight controller 17 are relatively high. Meanwhile, since the weight of the chemical agent 20 decreases with the progress of the agricultural chemical spraying, the DUTY values selected by the flight controller 17 become relatively low.

In this case, the flight controller 17 may average the DUTY values calculated respectively for the ESC 141 to the ESC 144 to accurately estimate the weight of the chemical agent 20 in a subsequent step. The DUTY values calculated respectively for the ESC 141 to the ESC 144 vary depending on the attitude and flight condition of the flying apparatus 10. Accordingly, calculating a DUTY average value (instruction signal average value) that is the average value of the four DUTY values can eliminate effects of the attitude and flight condition. Thus, the estimated remaining amount of the chemical agent 20 can be accurately calculated from the average value of the DUTY values regardless of the flight condition of the flying apparatus 10 as described later. The calculated DUTY average value is inputted into the companion controller 24.

In step S12, the companion controller 24 calculates the estimated remaining amount of the chemical agent 20 that is an estimated weight value. Specifically, the companion controller 24 reads the DUTY average value and a battery voltage value that is a voltage value of the battery 21. Then, the companion controller 24 calculates the estimated remaining amount of the chemical agent 20 based on a predetermined function that has the DUTY average value and the battery voltage value as variables.

In the present embodiment, the estimated remaining amount of the chemical agent 20 is calculated by taking the DUTY average value and the battery voltage value into consideration. The reason for this is as follows. When the battery voltage value decreases, the flight controller 17 increases the DUTY values to cause the motors 12 to rotate at the predetermined rotation speeds. Accordingly, the DUTY values gradually increase as the spraying of the chemical agent 20 using the flying apparatus 10 progresses. Thus, if the estimated remaining amount of the chemical agent 20 is calculated by using only the DUTY values as variables, an excessively-large estimated remaining amount may be calculated. Accordingly, in the present embodiment, the correction of the DUTY values using the battery voltage value is performed to accurately calculate the estimated remaining amount of the chemical agent 20.

In step S13, the companion controller 24 and the flight controller 17 transmit information indicating the estimated remaining amount of the chemical agent 20. Specifically, the information indicating the estimated remaining amount of the chemical agent 20 is transmitted from the flying apparatus 10 to the display device 22 via the communication unit 25 and the operation device 28 by wireless communication.

In step S14, the estimated remaining amount of the chemical agent 20 is displayed on the display unit 23 of the display device 22. The operator can know the estimated remaining amount of the chemical agent 20 by viewing the display unit 23. Accordingly, when the estimated remaining amount of the chemical agent 20 reaches or falls below a certain amount, the operator can move the flying apparatus 10 to a predetermined location and refill the chemical agent 20.

FIG. 4 is a graph illustrating changes in motor output values and a spraying state over time in the flying apparatus 10. The horizontal axis of this graph represents lapsed time, and the vertical axis represents a motor output (DUTY value) and an on-off state of a spraying switch. In this case, the chemical agent 20 is sprayed from the spraying device 18 when the spraying switch is in the on state. Meanwhile, no chemical agent 20 is sprayed from the spraying device 18 when the spraying switch is in the off state.

This graph illustrates the DUTY values outputted from the flight controller 17 respectively to the ESC 141 to the ESC 144 to cause the four motors of the motor 121 to the motor 124 included in the flying apparatus 10 to rotate. The DUTY value outputted to the ESC 141 is illustrated by a solid line, the DUTY value outputted to the ESC 142 is illustrated by a broken line, the DUTY value outputted to the ESC 143 is illustrated by a one-dot chain line, and the DUTY value outputted to the ESC 144 is illustrated by a two-dot chain line. Moreover, the on-off state of the spraying switch is illustrated by a solid line.

The DUTY values inputted into the ESC 141 to the ESC 144 in this graph gradually decrease over time while the spraying switch is in the on state. Meanwhile, the DUTY values inputted into the ESC 141 to the ESC 144 do not change while the spraying switch is in the off state. The reason why such a phenomenon can be observed is that, while the spraying switch is in the on state, the remaining amount of the chemical agent 20 gradually decreases, and the DUTY values needed to maintain the flying apparatus 10 at a constant altitude decrease. Accordingly, it can be understood that the decrease amounts of the DUTY values and the decrease amount of the chemical agent 20 are positively correlated with each other, and the remaining amount of the chemical agent 20 can be estimated from the DUTY values.

Figure 5:
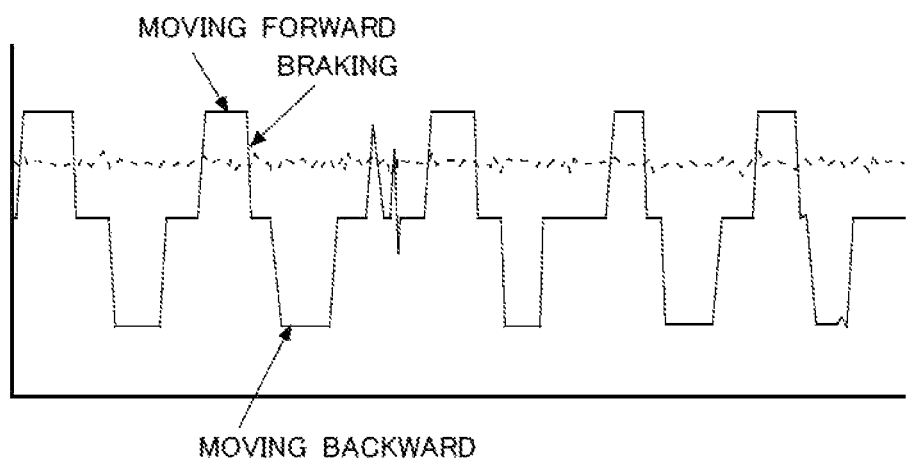
FIG. 5 is a graph illustrating changes in an output value of motors and a moving speed of the flying apparatus over time in the flying apparatus according to the embodiment of the present invention.

FIG. 5 is a graph illustrating changes in the motor output values and the moving speed of the flying apparatus 10 over time in the flying apparatus 10. The horizontal axis of this graph represents lapsed time, and the vertical axis represents a pitch operation (forward-backward operation) of the flying apparatus 10 and a motor average output (DUTY average value). Moreover, the pitch operation is illustrated in a solid line, and the motor average output is illustrated in a dotted line.

With reference to this graph, the operator can cause the flying apparatus 10 to move forward, brake, and move backward by operating the operation device 28. When the flying apparatus 10 sprays the agricultural chemical, such an operation is repeatedly performed. When the flying apparatus 10 moves forward, brakes, and moves backward, each of the DUTY values inputted from the flight controller 17 respectively to the ESC 141 to the ESC 144 greatly changes.

Meanwhile, although there are indications of slight changes, no great changes can be seen in the DUTY average value illustrated by the dotted line in the operations of forward moving, braking, and the backward moving. Estimating the remaining amount of the chemical agent 20 based on the DUTY average value thus enables stable and accurate estimation of the remaining amount of the chemical agent 20 irrespective of the operation status of the flying apparatus 10.

The aforementioned present embodiment can provide the following main effects.

According to the flying apparatus 10 of the present invention, the weight of the transported object can be estimated from the instruction signals generated to cause the fuselage base portion 16 to be at a predetermined position in a predetermined attitude. Accordingly, it is possible to estimate the weight of the transported object while eliminating the need for a dedicated weight sensor.

Moreover, since the remaining amount of the chemical agent 20 can be constantly calculated from the DUTY average value, the remaining amount of the chemical agent 20 being sprayed can be estimated in real time.

Furthermore, calculating the estimated weight of the chemical agent 20 based on the DUTY average value enables stable calculation of the estimated weight of the chemical agent 20 regardless of whether the flying apparatus 10 is in the hovering state or the moving state.

Moreover, taking the voltage value of the battery 21 into consideration in addition to the DUTY average value in the calculation of the estimated weight of the chemical agent 20 enables more accurate calculation of the estimated weight.

Although the embodiment of the present invention has been described above, the present invention is not limited to this embodiment and can be changed within a scope not departing from the spirit of the present invention. Moreover, the modes described above may be combined with one another.

Although FIG. 1 illustrates the electric drone that uses only the battery as an energy source as an example of the flying apparatus 10, a hybrid drone that uses an engine and a battery as an energy source may be adopted.

Although the estimated remaining amount of the chemical agent 20 is calculated based on the DUTY average value in the aforementioned embodiment, the estimated remaining amount may be calculated by using the DUTY values that are not averaged. For example, the estimated remaining amount may be calculated by using one of the DUTY values, a median value of the DUTY values, or the like.

Although the estimated remaining amount of the chemical agent 20 is calculated based on the DUTY average value and the battery voltage value in the aforementioned embodiment, the estimated remaining amount may be calculated by using only the DUTY average value.

Although the remaining amount of the chemical agent 20 that is the transported object is estimated from the DUTY values in the aforementioned embodiment, an object other than the chemical agent 20 may be adopted as the transported object.

EXPLANATION OF THE REFERENCE NUMERALS

10 flying apparatus
11 rotor
111 rotor
112 rotor
113 rotor
114 rotor
12 motor
121 motor
122 motor
123 motor
124 motor
13 flight sensor
14 electric power conversion unit
141 ESC
142 ESC
143 ESC
144 ESC
15 computation control unit
16 fuselage base portion
17 flight controller
18 spraying device
19 support arm
20 chemical agent
21 battery
22 display device
23 display unit
24 companion controller 25 communication unit
26 communication unit
271 arm
272 arm
273 arm
274 arm
28 operation device
29 chemical agent tank
32 leg portion
33 leg portion
34 support arm
35 nozzle
36 nozzle
37 pipe

The invention claimed is:

1. A flying apparatus that transports a transported object, comprising:
a rotor;
a motor;
a flight sensor;
an electric power conversion unit;
a battery that supplies electric power to the electric power conversion unit; and
a computation control unit, wherein
the rotor is rotated to generate thrust for causing a fuselage base portion to go airborne,
the motor rotationally drives the rotor,
the flight sensor measures a physical quantity acting on the fuselage base portion,
the computation control unit generates an instruction signal based on the physical quantity to cause the fuselage base portion to be at a predetermined position in a predetermined attitude,
the electric power conversion unit adjusts an amount of electric power supplied to the motor based on the received instruction signal,
the computation control unit calculates an estimated weight that is an estimation value of a weight of the transported object, based on a magnitude of the instruction signal, and
the computation control unit calculates the estimated weight based on the instruction signal and a voltage value of the battery.

2. The flying apparatus according to claim 1, further comprising a spraying device, wherein
the transported object is an agent sprayed by the spraying device,
the computation control unit calculates an estimated remaining amount that is an estimation value of a remaining amount of the agent, based on the magnitude of the instruction signal.

3. The flying apparatus according to claim 1, wherein
the flying apparatus includes a plurality of the rotors, a plurality of the motors, and a plurality of the electric power conversion units, and
the computation control unit
generates a plurality of the instruction signals to be inputted into the respective electric power conversion units, and
estimates the estimated weight of the transported object based on an instruction signal average value that is an average value of the instruction signals.

4. The flying apparatus according to claim 1, wherein a signal indicating the estimated weight is transmitted to a display device, and the estimated weight is displayed on a display unit of the display device.

5. A method of operating a flying apparatus that transports a transported object, the flying apparatus comprising:
a rotor;
a motor;
a flight sensor;
an electric power conversion unit; and
a battery that supplies electric power to the electric power conversion unit, wherein
the rotor is rotated to generate thrust for causing a fuselage base portion to go airborne,
the motor rotationally drives the rotor, and
the method comprises:
measuring a physical quantity acting on the fuselage base portion by the flight sensor,
generating an instruction signal based on the physical quantity to cause the fuselage base portion to be at a predetermined position in a predetermined attitude,
adjusting an amount of electric power supplied to the motor based on the received instruction signal by the electric power conversion unit, and
calculating an estimated weight that is an estimation value of a weight of the transported object, based on a magnitude of the instruction signal,
wherein the calculating step further comprises calculating the estimated weight based on the instruction signal and a voltage value of the battery.

6. The method according to claim 5, wherein
the flying apparatus further comprises a spraying device, and
the transported object is an agent sprayed by the spraying device, and
the method includes calculating an estimated remaining amount that is an estimation value of a remaining amount of the agent, based on the magnitude of the instruction signal.

7. The method according to claim 5, wherein
the flying apparatus includes a plurality of the rotors, a plurality of the motors, and a plurality of the electric power conversion units, and
the method comprises:
generating a plurality of the instruction signals to be inputted into the respective electric power conversion units, and
estimating the estimated weight of the transported object based on an instruction signal average value that is an average value of the instruction signals.

8. The method according to claim 5, comprising:
transmitting a signal indicating the estimated weight to a display device, and
displaying the estimated weight on a display unit of the display device.

* * * * *